Jan. 22, 1952 C. N. SMYTH 2,583,021
SELECTION OF PREDETERMINED INTERRUPTION
PULSE FOR FRAME SYNCHRONIZATION
Filed Aug. 19, 1947 2 SHEETS—SHEET 1

Inventor
CHARLES N. SMYTHE
By [signature]
Attorney

Jan. 22, 1952 C. N. SMYTH 2,583,021

SELECTION OF PREDETERMINED INTERRUPTION PULSE FOR FRAME SYNCHRONIZATION

Filed Aug. 19, 1947 2 SHEETS—SHEET 2

Inventor
CHARLES N. SMYTHE

By [signature]

Attorney

Patented Jan. 22, 1952

2,583,021

UNITED STATES PATENT OFFICE 2,583,021

SELECTION OF PREDETERMINED INTERRUPTION PULSE FOR FRAME SYNCHRONIZATION

Charles Norman Smyth, Sidcup, England, assignor to International Standard Electric Corporation, New York, N. Y., a corporation of Delaware Application August 19, 1947, Serial No. 769,551
In Great Britain May 26, 1939

Section 1, Public Law 690, August 8, 1946
Patent expires May 26, 1959

1 Claim. (Cl. 178—7.3)

Figure 1:
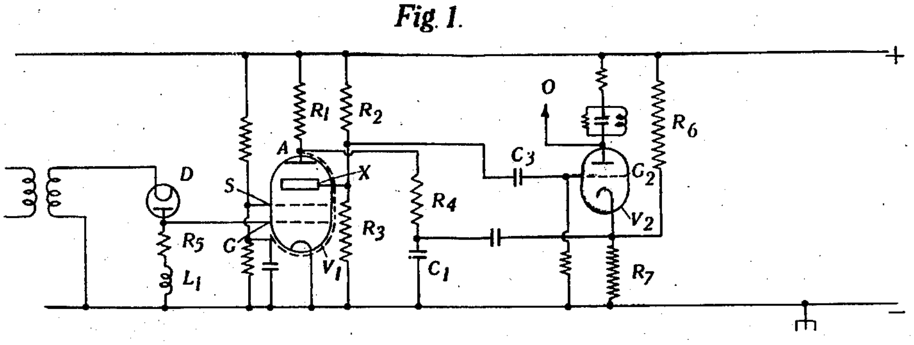

This invention relates to circuits primarily useful in television receivers for the derivation of frame synchronising pulses from a television signal. The invention is concerned with circuits having the above-mentioned function and wherein short impulses constituting the transmitted frame signal are superposed upon a pulse derived by integration from the transmitted frame signal, the resultant being applied to a blocked amplifier to release it, for the transmission of pulses at fixed intervals. Such circuits, the detailed operation of which will become clear from the ensuing description of the invention, are already known and the present invention comprises improvements wherein a single valve with two output circuits is used for setting up at suitable amplitudes the pulses which are to be superposed. The valve employed is in the preferred form of the invention of the type employing secondary emission.

In accordance with the invention an electron discharge device to which the frame signal is applied is provided with a substantially linear output circuit (a circuit comprising a load impedance such as to set up a voltage which is substantially a replica of the input voltage) and an integrating output circuit with connections for applying the two outputs in series to a second electron discharge device serving as or controlling a blocked amplifier.

In another aspect the circuit of the invention comprises an electron discharge device having a control electrode with connections for applying the frame signal thereto, a secondary-emitting electrode and a collector electrode, couplings one of which includes an integrating circuit being provided for respectively applying the outputs from the latter two electrodes in opposite sense to the input circuit of a blocked amplifier which is thereby periodically released.

In order to obtain a satisfactory timed frame synchronising pulse in a television receiver from a transmission of the type sent out by the B. B. C. or similar system in which the frame synchronising signal comprises a series of pulses of greater frequency than line synchronising pulses, it is proposed to employ a secondary emission valve to provide two separate outputs, one a true reproduction of the synchronising impulses, both line and frame as transmitted and the other an integrated pulse obtained from the frame signal, and to combine these two outputs together in the medium of a further valve which is so arranged that it provides no output at all except during the frame impulse when it reproduces the synchronising pulse sent out from the transmitter.

In this way the final synchronising signal developed in the output of the second valve is timed exactly by the transmitter and does not depend on the variable operation of any integrating circuit.

The voltage output obtained across the integrating circuit varies each alternate frame due to the half line difference at the commencement of the frame synchronising pulses, and for this purpose it is not desirable to use the integrated voltage directly for synchronising if exact interlacing is required, and so in the proposed circuit the integrated voltage is used to release a blocked amplifier valve which then amplifies the synchronising pulse and passes it to the saw-tooth generator in its correct time relationship with the transmitted picture.

This method of obtaining a frame synchronising pulse is not new in principle, and has previously been employed using a separate valve for each function. A single valve preferably of the type utilising secondary emission is now employed to provide separate outputs. In the case of a secondary emission valve the two outputs are taken respectively from the main anode or collector electrode and from the auxiliary cathode or secondary emitting electrode. Usually the valve will be biassed to function as an amplitude filter.

Figure 2:
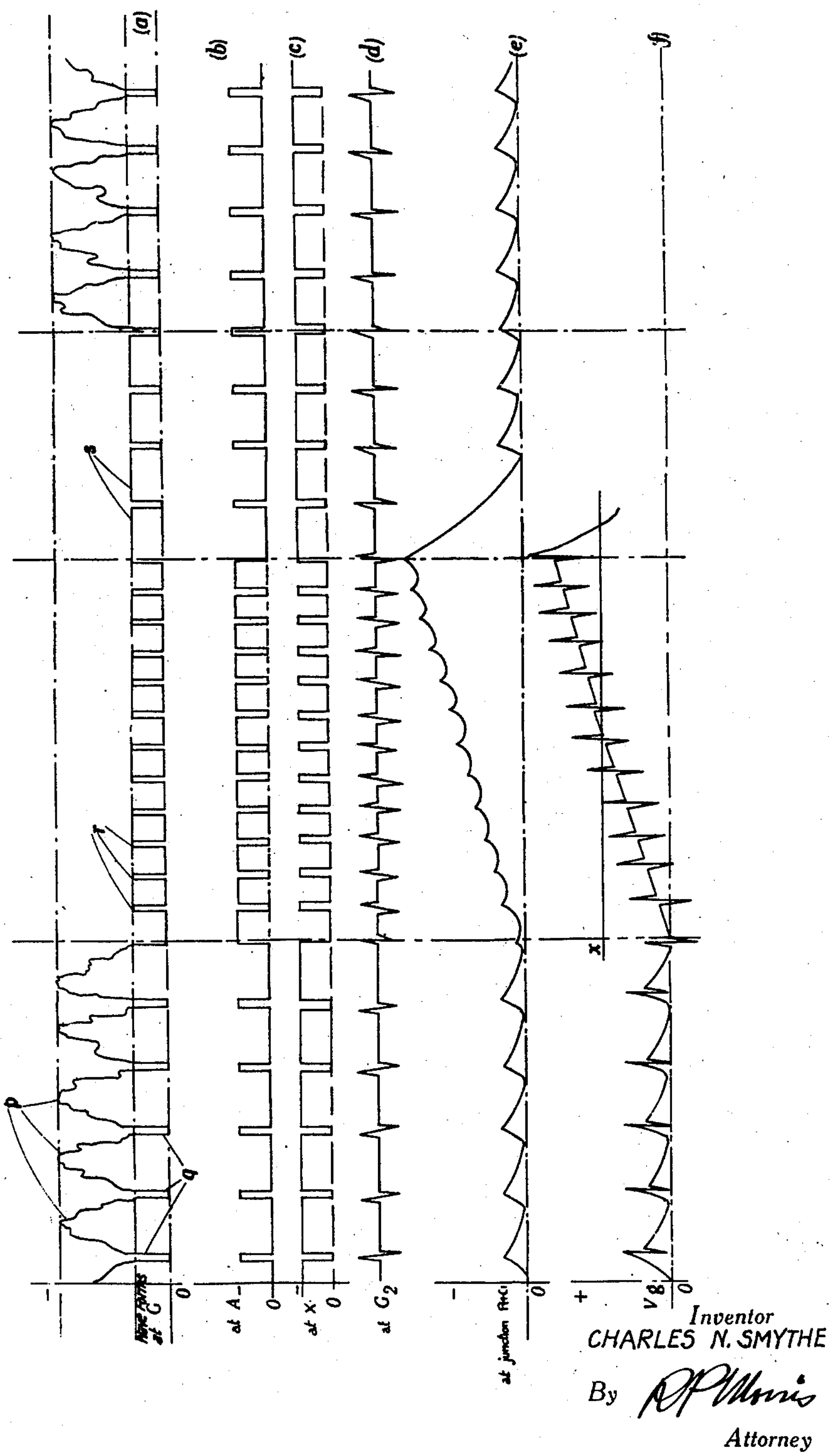

One circuit embodying the invention is illustrated in Fig. 1 of the accompanying drawings. Fig. 2 shows the wave forms at various points in the circuit of Fig. 1.

The valve $V_1$ is a secondary emission valve having output load $R_1$ in the circuit of anode A and the combination $R_2$ and $R_3$ in the circuit of auxiliary cathode X. The screen of the valve S is supplied with a steady potential from a simple potentiometer. The grid G is directly coupled to the diode detector D which is used to rectify the high frequency television signal, the complete diode output voltage developed across the diode load $R_5$, $L_1$, both A. C. and D. C. components, being directly transferred to the grid G. This voltage wave is shown at (*a*) in Fig. 2. It is of well-known form and comprises portions *p* corresponding to successively scanned picture lines, line synchronising pulses or gaps *q*, frame synchronising signals *r* of twice line frequency and black signals *s*. In Fig. 2 the ordinates from the datum lines 0 are negative except in the case of curve *f*. The output from the diode is of such magnitude that the valve $V_1$ is overbiassed in the negative direction and only passes current during the synchronising pulse periods when the high frequency signal falls to zero. The output voltages obtained at the electrodes A and X (shown at (*b*) and (*c*) on Fig. 2) consist of synchronising pulses, both line and frame, separated from the picture. The voltage of a secondary emissive electrode such as X is in phase with the grid voltage so that the voltage at X (curve *c*) comprises pulses similar in shape and sign to pulses *q* and *r* of curve *a*. The anode voltage however is in phase opposition and thus has the form shown in curve *b*. The output from X is transferred to the grid $G_2$ of the valve $V_2$ over a small coupling condenser $C_3$ the effect of which is to yield on the grid of valve $V_2$ a voltage of the form shown in curve *d*. The output from A is integrated by the circuit $R_4$, $C_1$ and fed to the cathode of the valve $V_2$. The integrated voltage is shown (inverted) at (*e*) in Fig. 2.

The valve $V_2$ is overbiassed by means of the potentiometer circuit $R_6$,$R_7$ and in the quiescent condition no anode current flows. Further, the synchronising pulses applied to the grid are not sufficient to overcome the bias and cause current to flow. Thus the valve is inoperative except when the integrated pulse is applied in addition to the cathode during the frame pulse period.

Thus $V_2$ serves as an amplifier of the frame synchronising pulses only. If the anode load is suitably chosen, the output at the point O will comprise a series of full peaks at twice line frequency superimposed on the integrated wave form as shown (inverted) at *f* in Fig. 2.

Since the synchronisation occurs immediately the voltage at O exceeds a certain value—it will always occur exactly at the time of one of the half line impulses and not depend on slight variations in the shape of the integrated curve. This is due to the fact that the wave at O consists of successive pulses of increasing peak value rather than a continuously increasing voltage such as that of the integrated wave alone.

What is claimed is:

A circuit for separating frame synchronizing pulses from a television signal comprising a multi-electrode vacuum tube having a secondary emissive electrode and an anode electrode, means for supplying said tube with a demodulated television signal having positive frame synchronizing pulses, biassing means to render said tube conductive only during said synchronizing pulses, a pair of output circuits coupled respectively to the anode electrode and the secondary emissive electrode of said tube, whereby pulses of opposite polarities will be derived in response to said television signal, integrating means coupled to one of said output circuits for integrating one of said pulse outputs, an amplitude selective device, and means for coupling said integrating means and the other of said output circuits to said amplitude selective device in combining relation to render it responsive to a predetermined magnitude of said combined outputs.

CHARLES NORMAN SMYTH.

REFERENCES CITED

The following references are of record in the file of this patent:

FOREIGN PATENTS

| Number | Country | Date |
|---|---|---|
| 379,988 | Italy | Apr. 15, 1940 |
| 514,807 | Great Britain | Oct. 13, 1939 |
| 517,181 | Great Britain | Jan. 23, 1940 |
| | (Partial duplicate of French 841,045) | |
| 529,790 | Great Britain | Nov. 28, 1940 |
| 841,045 | France | May 9, 1939 |
| 845,897 | France | Sept. 4, 1939 |
| 847,675 | France | Oct. 13, 1939 |

OTHER REFERENCES

Wireless World, March 30, 1939; pages 303 and 304.